June 2, 1964        G. DI PASQUALE        3,134,985
BIDET
Filed Aug. 7, 1963        3 Sheets-Sheet 1
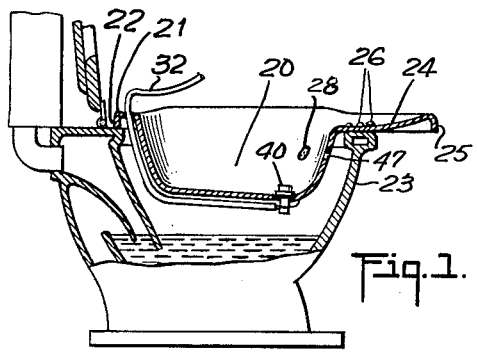
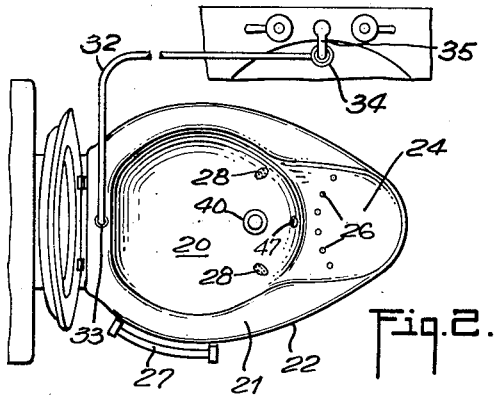
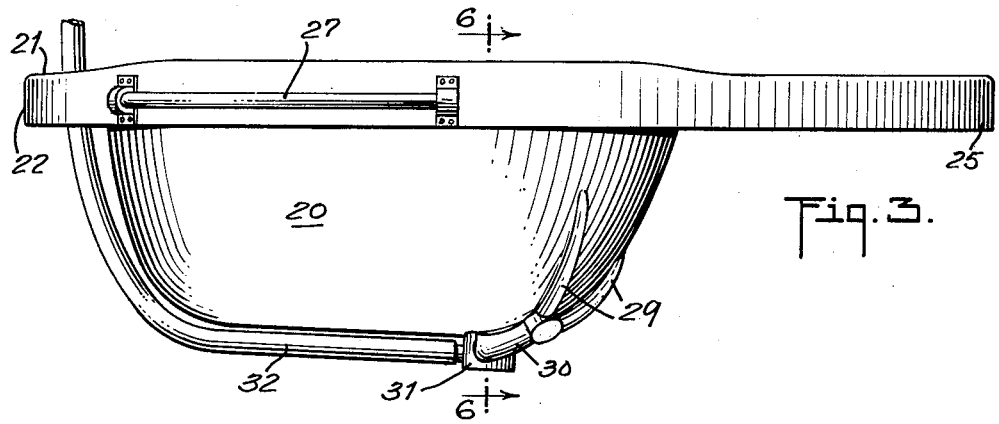
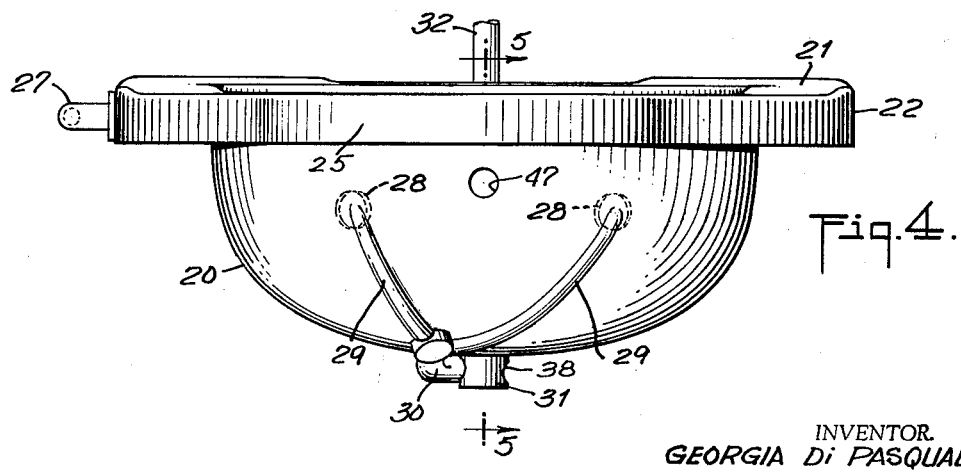
INVENTOR.
GEORGIA Di PASQUALE
BY
ATTORNEY June 2, 1964  G. DI PASQUALE  3,134,985
BIDET
Filed Aug. 7, 1963  3 Sheets-Sheet 2
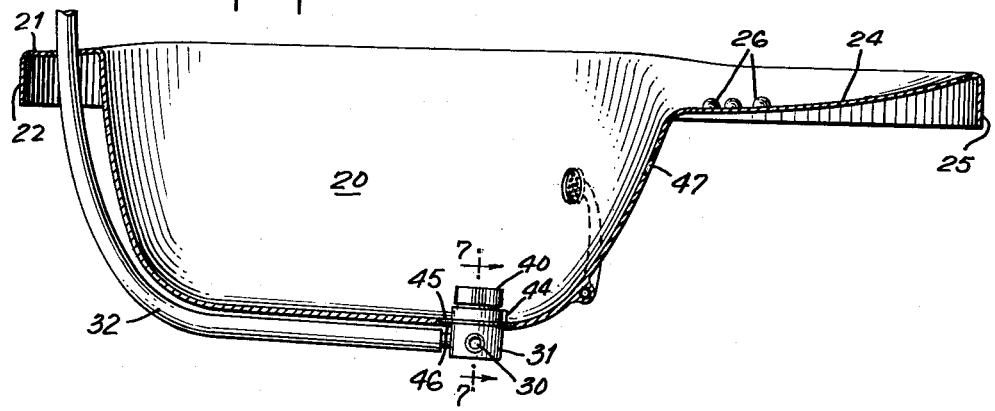
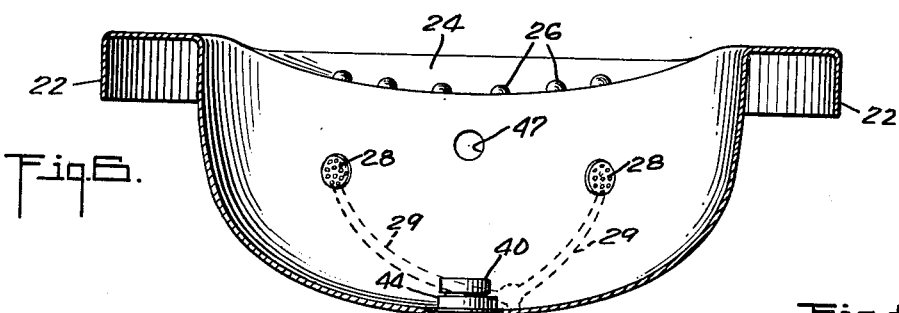
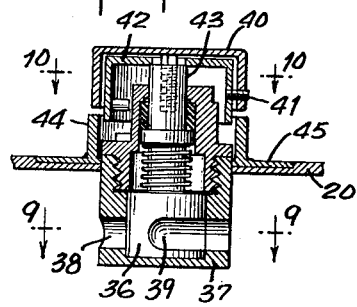
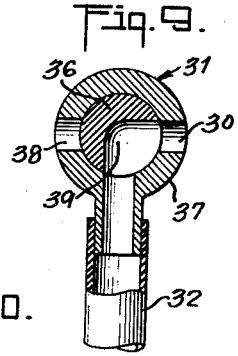
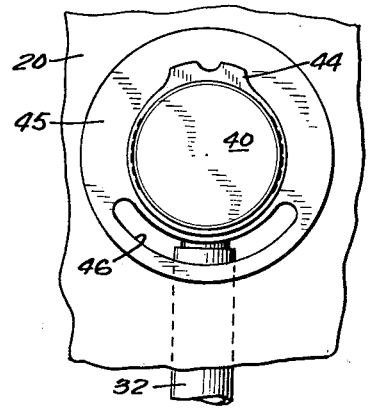
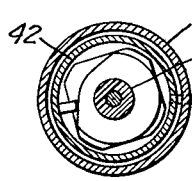
INVENTOR.
GEORGIA Di PASQUALE
BY
ATTORNEY June 2, 1964  G. DI PASQUALE  3,134,985
BIDET
Filed Aug. 7, 1963  3 Sheets-Sheet 3
Fig. 11.
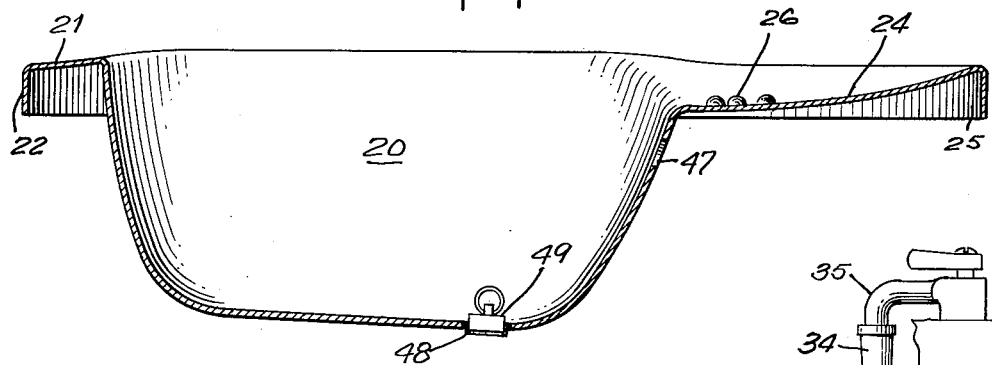
Fig. 12.
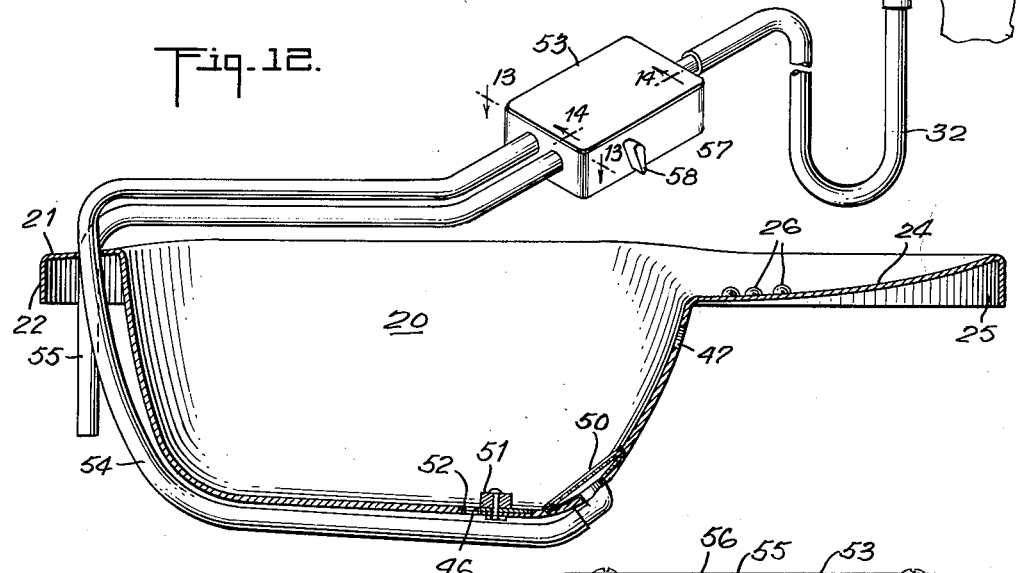
Fig. 13.
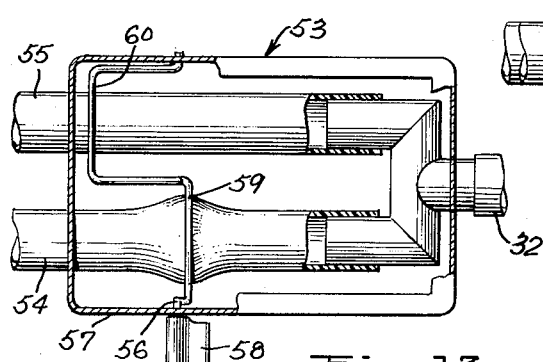
Fig. 14.
INVENTOR.
GEORGIA DiPASQUALE
BY
ATTORNEY United States Patent Office 3,134,985
Patented June 2, 1964

3,134,985
BIDET
Georgia Di Pasquale, 205 Birchwood Road,
New Milford, N.J.
Filed Aug. 7, 1963, Ser. No. 300,505
6 Claims. (Cl. 4—7)

The invention herein disclosed relates to devices in the nature of bidets and the general objects of the invention are to provide a practical and desirable, inexpensive, compact, light weight, portable attachment applicable to standard toilet fixtures now in use, which can be quickly and easily applied or removed, which will hold in place without slipping, which can be easily kept clean and sanitary and which can be readily connected with and disconnected from the available water supply and in which back pressure which might cause leakage of such connections is avoided.

Other special objects of the invention are to provide apparatus of this nature having desirable hydrotherapy characteristics and regulatable to meet varying requirements.

The foregoing and other desirable objects are accomplished by the novel combination and relation of parts hereinafter described and illustrated in different examples in the accompanying drawings.

The drawings referred to show the invention embodied in different forms but it will be appreciated that the structure may be further modified and changed, all within the intent and scope of the invention as hereinafter defined and claimed.

FIG. 1 in the drawings is a broken and part sectional view showing one of these new bidets mounted in place on an ordinary toilet bowl.

FIG. 2 is a broken plan view, showing the connection with the water supply.

FIG. 3 is a side elevation of the bidet on a larger scale.

FIG. 4 is a front elevation of the same.

FIG. 5 is a longitudinal sectional view on substantially the plane of line 5—5 of FIG. 4.

FIG. 6 is a cross sectional view on substantially the plane of line 6—6 of FIG. 3.

FIG. 7 is a broken sectional view of the compound control valve, this view on substantially the plane of line 7—7 of FIG. 5.

FIG. 8 is a plan view looking down on the control valve.

FIGS. 9 and 10 are cross sectional views of the valve on substantially the planes of lines 9—9 and 10—10 of FIG. 7.

FIG. 11 is a longitudinal sectional view of a simplified, modified form of the invention, without running water supply.

FIG. 12 is a longitudinal sectional view of another embodiment of the invention with different location of the spray nozzle and with a no-back pressure control valve.

FIGS. 13 and 14 are detailed sectional views of the latter control valve, FIG. 13 a horizontal and FIG. 14 a vertical sectional view.

In the several embodiments illustrated the invention is shown as a one piece basin or pan of light weight sheet material such as plastic or metal, having sufficient depth for the uses intended and of a size to fit easily into an ordinary toilet bowl and having means to center and hold it properly supported on the rim of the bowl.

Specifically this is shown as a relatively deep pan or basin 20 having a laterally extended rim 21 with a dependent flange 22 at the back and about the sides of the same to seat on top of the rim of a toilet bowl 23.

At the front the basin is extended in a lowered, relatively flat wall 24 inclined inwardly as in FIGS. 1 and 5 to form a soap tray, draining back into the basin.

This lowered soap tray formation rests upon the rim of the toilet bowl as shown in FIG. 1, thus to support the basin at the front and the dependent side flanges 22 are shown as continued on about the projecting soap tray as indicated at 25 to provide a smooth, symmetrical, finished exterior.

The shallow soap tray formation is shown as having a number of upwardly projecting beads 26 on the floor of the same to prevent soap or sponge from slipping back into the basin.

A towel rack forming bar 27, is shown in FIGS. 2, 3 and 4, carried by and spaced from the dependent side flange 22. This towel rack is so placed that it may be used, if desired, as a handle for carrying the basin.

In the first form of the invention, FIGS. 1 to 10, rearwardly directed spray nozzles 28 are located on the front wall of the basin connected by branches 29 with a supply tube 30 extending from the side of the control valve 31 mounted in the bottom of the basin.

A main supply connection 32 is shown, running from the control valve up through a guide opening 33 at the back of the basin, having an end fitting 34 engageable over a faucet or other service outlet 35, FIG. 2.

The control valve is shown in detail in FIGS. 7, 8, 9 and 10 as embodying a valve plug 36 rotatable in the valve body 37 to communicate the supply connection 32, FIG. 9 with either the outlet 30 to the spray nozzles or an outlet 38 discharging beneath the basin into the toilet bowl.

As shown in FIG. 9, the valve plug has a wide angle cut 39 in the side of the same which will open the supply flow to either or both the spray connections 30 or to the discharge outlet 38 at all times so as to avoid any back pressure in line 32 which might cause it to leak or to disconnect from the faucet.

Operation of the control valve is effected by turning a hand knob 40, FIG. 7, connected by screw 41 with a cap 42 on the upper end of the valve stem 43.

Drainage of the basin is effected by turning a sleeve 44 about the valve body, attached to a valve disk 45, ported at 46 to discharge down into the bowl.

The basin has further drainage facility in the form of an overflow opening 47 in the front wall of the same.

FIGS. 11 and 12 show how the same basin shell or body may be used in other, simplified forms.

In FIG. 11 the water circulating means is omitted and a simple discharge outlet 48 is provided in the bottom of the basin with removable plug 49.

FIG. 12 shows the basin equipped with a single spray nozzle 50 in the lower front portion and drainage controlled by a turnbutton 51 connected with valve disk 52.

To prevent any possibility of back pressure, the main supply line 32 from the faucet is, in this case, equipped with a double acting pinch valve 53 which will either pass water through line 54 to the spray nozzle or through a branch line 55 to the toilet bowl.

FIGS. 13 and 14 illustrate the construction of this reversely acting valve as embodying a shaft 56 journaled in the valve casing 57 and having an exposed handle or knob 58 by which it can be turned to force one or the other of the two crank arms 59, 60 into pinching engagement with the elastic tubing 54, 55.

The basin can be made in the oval shape shown or in circular or other shapes to fit into and be supported on an ordinary toilet bowl and this can be of lightweight construction so as to be easily handled and placed in position. The shape and flange construction assists in locating and holding the basin securely in position and the simplicity of form enables quick and easy cleaning.

The valve mechanism is readily accessible and operable to control desired flow and discharge.

The flat soap tray extension also assists in the proper placing and support of the basin on the bowl and the buttons or beads on this tray hold the soap and sponge or washcloth in place without obstructing drainage back into the basin.

The towel rack on the side of the basin is a convenience for the user and may be of assistance in carrying and placing the basin on the bowl.

The simple form of the invention, without water connections, shown in FIG. 11, is of practical importance because of its simplicity, lightweight and low cost construction and because of its portability and ease of handling. It may be readily filled from any convenient faucet or water outlet or be supplied from any available water container.

Similarly, the simple form shown in FIG. 12 is highly desirable because of convenience of control with the no back pressure valve in the line leading from the faucet and available for operation at the side of the basin.

Only a single spray nozzle is shown in this FIG. 12 form of the invention but it is contemplated that additional nozzles may be utilized, such as shown in FIGS. 5 and 6. Also that nozzles of different forms and action may be utilized.

The water connections in each instance are located at the back of the basin so as to be out of the way when the bidet is in use and so that there is no danger of tripping or catching on such connections.

While the general oval shape of basin may be preferred, since this adapts it to most toilet bowls and may be most convenient form for general use, it is contemplated that the basin may be made in other shapes, preferably in each instance with the extended wash tray at the front. This tray extension serves the further useful purpose of catching spray and preventing drip from the front of the bidet.

It will be apparent from the foregoing that the invention disclosed has many hygienic and medical advantages, made useful by the novel construction to the general public and particularly of value to the ailing, weak or partly disabled.

The invention does not require any extension or changes in plumbing and by reason of its compact form may be packed away and stored in any convenient small space when not in use.

What is claimed is:

1. A portable bidet comprising
a one-piece basing of thin lightweight sheet material of a size and shape to freely enter a toilet bowl and having a laterally extended rim about the same with downturned flange about the back and sides of the same and with a forwardly extended flat and inwardly inclined soap tray projection at the front of the same with downwardly extending flange about the front edge in continuation of the dependent flange about the sides of the basin, and
regulatable drainage means in the bottom of the basin.

2. A portable bidet comprising
a one-piece basin of thin lightweight sheet material of a size and shape to freely enter a toilet bowl and having a laterally extended rim about the same with downturned flange about the back and sides of the same and with a forwardly extended flat and inwardly inclined soap tray projection at the front of the same with downwardly extending flange about the front edge in continuation of the dependent flange about the sides of the basin,
regulatable drainage means in the bottom of the basin, and
rounded upstanding buttons on the floor of said flat soap tray projection for preventing soap or sponge slipping back into the basin without restricting drainage.

3. A portable bidet comprising
a one-piece basin of thin lightweight sheet material of a size and shape to freely enter a toilet bowl and having a laterally extended rim about the same with downturned flange about the back and side of the same and with a forwardly extended flat and inwardly inclined soap tray projection at the front of the same with downwardly extending flange about the front edge in continuation of the dependent flange about the sides of the basin, and
regulatable drainage means in the bottom of the basin, including
a rotatable control valve having water supply and drainage connections.

4. A portable bidet comprising
a one-piece basin of thin lightweight sheet material of a size and shape to freely enter a toilet bowl and having a laterally extended rim about the same with downturned flange about the back and sides of the same and with a forwardly extended flat and inwardly inclined soap tray projection at the front of the same with downwardly extending flange about the front edge in continuation of the dependent flange about the sides of the basin,
regulatable drainage means in the bottom of the basin, including
a rotatable control valve having water supply and drainage connections, and
water spray means in the wall of the basin connected through said valve with said water supply connection.

5. A portable bidet comprising
a one-piece basin of thin lightweight sheet material of a size and shape to freely enter a toilet bowl and having a laterally extended rim about the same with downturned flange about the back and sides of the same and with a forwardly extended flat and inwardly inclined soap tray projection at the front of the same with downwardly extending flange about the front edge in continuation of the dependent flange about the sides of the basin, and
regulatable drainage means in the bottom of the basin, including
a rotatable control valve having water supply and drainage connections,
said water supply connection including tubing for connection with a water faucet and the basin having a guide opening at the back of the same for passage of said tubing.

6. A portable bidet comprising
a one-piece basin of thin lightweight sheet material of a size and shape to freely enter a toilet bowl and having a laterally extended rim about the same with downturned flange about the back and sides of the same and with a forwardly extended flat and inwardly inclined soap tray projection at the front of the same with downwardly extending flange about the front edge in continuation of the dependent flange about the sides of the basin, regulatable drainage means in the bottom of the basin, including
a rotatable control valve having water supply and drainage connections, including
a turn knob,
a shaft operable by said turn knob and having cranks offset in angular relation, and
flexible tubing positioned to be alternately pinched by said angularly offset cranks.

References Cited in the file of this patent
UNITED STATES PATENTS

| | | |
|---|---|---|
| 1,655,864 | Haslett | Jan. 10, 1928 |
| 1,778,620 | Barta | Oct. 14, 1930 |
| 1,814,352 | Watraus | July 14, 1931 |
| 2,036,985 | Salvoni | Apr. 7, 1936 |
| 2,104,210 | Salvoni | Jan. 4, 1938 |